Figures 1, 2:
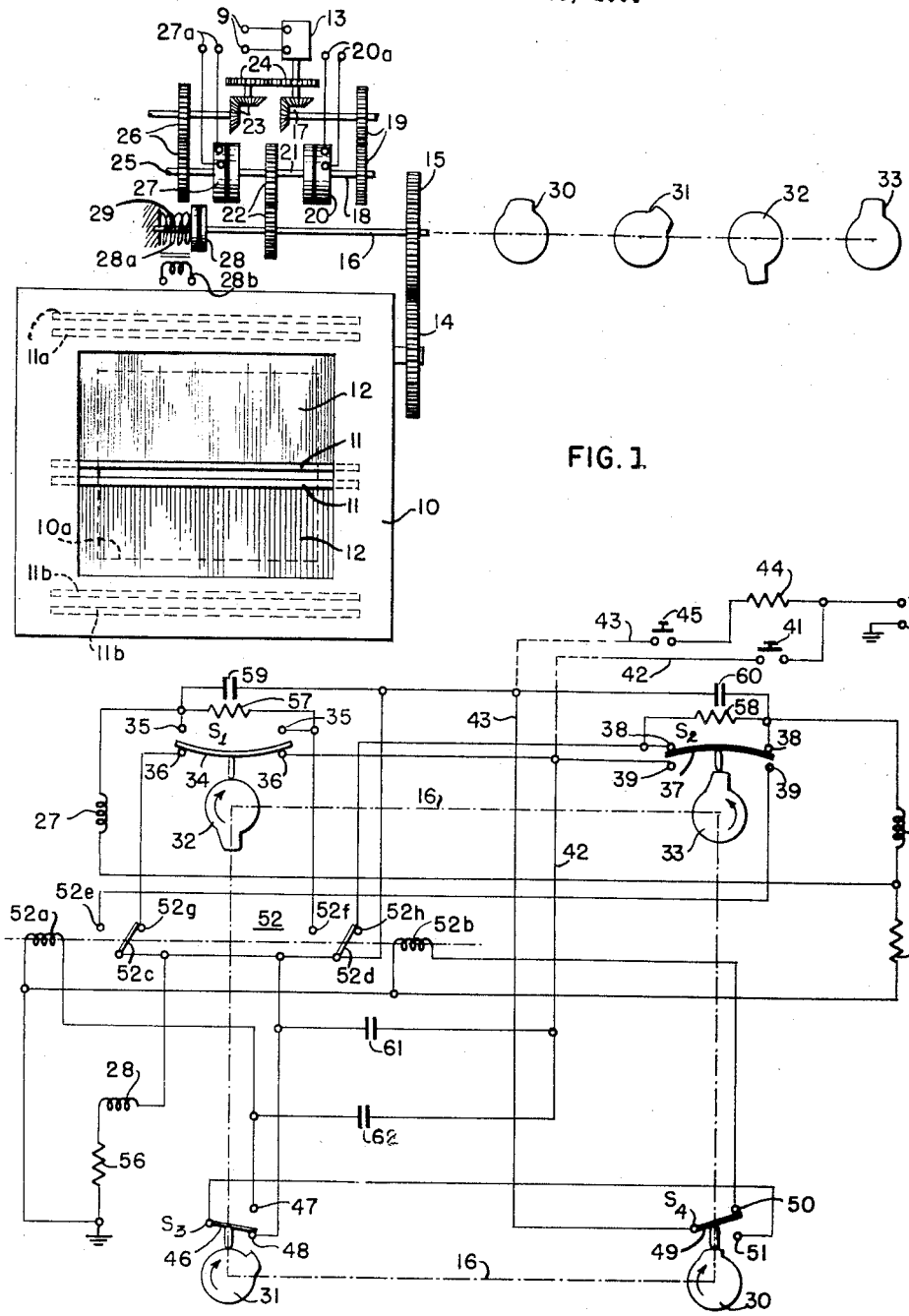

Aug. 23, 1960   I. W. DOYLE ET AL   2,949,834
DRIVING SYSTEM FOR CAMERA SHUTTERS
Filed Jan. 26, 1959

INVENTORS
IRVING W. DOYLE
ALFRED G. NASH
BY Laurence B. Dodds
ATTORNEY

United States Patent Office

2,949,834
Patented Aug. 23, 1960

2,949,834

DRIVING SYSTEM FOR CAMERA SHUTTERS

Irving W. Doyle, Massapequa, and Alfred G. Nash, Glen Cove, N.Y., assignors to Fairchild Camera and Instrument Corporation, a corporation of Delaware Filed Jan. 26, 1959, Ser. No. 792,249

14 Claims. (Cl. 95—57)

This invention relates to driving systems for camera shutters and, while it is of general application, it is particularly suitable for driving a focal plane shutter of an aerial camera by remote control and will be specifically described in such an application. This application is a continuation-in-part of applicants' copending application, Serial No. 267,353, filed January 21, 1952, now abandoned.

In the operation of focal plane shutter cameras it is desirable that the shutter be accelerated to its final velocity smoothly and in the very short interval while the shutter slit is traversing the initial limited portion of its movement and before it reaches the camera aperture; that it then move at a constant velocity across the aperture for a uniform exposure of the film; and that it then be decelerated smoothly and rapidly in the very short interval while it is traversing the final portion of its movement. It is also desirable that these operations be performed in sequence either automatically or semi-automatically under the control of an operator at a station remote from the camera.

It is an object of the present invention, therefore, to provide a new and improved driving system for camera shutters, by means of which one or more of the above-mentioned desirable characteristics may be realized.

In accordance with the invention, there is provided a system for driving the curtain shutter of a focal plane camera to effect uniform exposure of a frame of film, said shutter having a range of movement including a central exposure portion and limiting non-exposure portions comprising a driving mechanism for the shutter, means for storing kinetic energy, and means for transferring a portion of the stored kinetic energy to the driving mechanism to accelerate the shutter rapidly to substantially its exposure velocity during movement over one of its limiting movement portions and for controlling the driving mechanism to actuate the shutter at constant exposure velocity during movement over its central movement portion. The system also includes means for controlling the driving mechanism to decelerate the shutter to zero velocity during movement over the other of its limiting movement portions.

Further in accordance with the invention, there is provided a system for driving a camera shutter having a range of movement including a central exposure portion and limiting non-exposure portions comprising a driving element, a driven element for actuating the shutter, a driving mechanism interconnecting the elements and including a clutch, a releasable brake for the driven element, and means operable to engage the clutch and to release the brake to accelerate the shutter to substantially its final exposure velocity during its movement over one of the limiting non-exposure portions. The system also includes means operable substantially upon subsequent movement of the shutter over the central portion to release the clutch and to engage the brake to decelerate the shutter during its movement over the other limiting non-exposure portion.

For a better understanding of the present invention, together with other and further objects thereof, reference is had to the following description taken in connection with the accompanying drawing, while its scope will be pointed out in the appended claims.

Referring now to the drawing, Fig. 1 is an illustration, partly schematic, of a driving system for a camera shutter embodying the invention; while Fig. 2 is a circuit diagram of an electrical control system for use with the driving system of Fig. 1.

Referring now more particularly to Fig. 1 of the drawing, there is illustrated schematically a system for driving a reversible camera shutter of a focal plane camera 10. The shutter is illustrated as comprising a pair of spaced slit bars 11, 11 and attached light occluding curtains 12, 12 and movable across the aperture 10a of the camera 10. The camera 10 and the shutter comprising the elements 11, 12 forms no part of the invention, but the shutter may be of the type described and claimed in applicants' copending application, Serial No. 558,974, filed January 13, 1956, now Patent No. 2,907,256. The slit bars 11, 11 have a range of movement between the limiting positions shown in dotted lines as 11a, 11a and 11b, 11b and this range comprises a central exposure portion as the slit bars traverse the aperture 10a and limiting non-exposure portions between the edges of the aperture 10a and the limiting positions 11a, 11a and 11b, 11b, these limiting non-exposure portions being small fractions of the exposure portion.

The driving system also includes a continuously operating driving element, such as an electric motor 13 which, with the driving elements hereinafter described, has a substantial inertia and, therefore, a substantial momentum and kinetic energy. The motor 13 is preferably a constant speed motor, either a synchronous motor or a speed-regulated a synchronous motor, and may be energized from suitable supply circuit terminals 9, 9. The camera driving system also includes a driven element for driving the shutter and illustrated in the form of a gear 14 forming a part of the camera and driven by a gear 15 mounted on a shaft 16. The driving system also includes a reversible driving mechanism interconnecting or coupling the driving element or motor 13 and the driven element or gear 14. This driving mechanism includes bevel gearing 17 driven directly by the motor 13 and driving a shaft 18 through gearing 19. On the shaft 18 is mounted one element of an electromagnetic friction clutch 20, the other element of which is mounted on a shaft 21 which drives the shaft 16 through gearing 22.

For driving the shaft 16 in the reverse direction, there is provided bevelled gearing 23 driven by motor 13 through reversing gearing 24, the gearing 23 driving a shaft 25 through gearing 26. On the shaft 25 is mounted one element of a second electromagnetic friction clutch 27, the other element of which is mounted on the shaft 21. The electromagnetic friction clutches 20 and 27 are provided with terminals 20a and 27a, respectively, through which their energization may be effected. By virtue of the reversing of rotation effected through the gearing 24, the clutches 20 and 27 are selectable to actuate the shutter of the camera 10 in either direction.

There is also provided an electromagnetic friction brake 28 for the driven element or gear 14 comprising an element mounted on the shaft 16 and an element rotationally fixed but axially movable along a shaft 29 by a helical compression spring 28a, normally biasing the elements of the brake 28 into engagement. The brake 28 is also provided with a winding 28b which upon energization is effective to disengage or release the brake. The clutches 20 and 27 and the brake 28 are designed with sufficient slippage to provide smooth acceleration and deceleration in starting and stopping the connected driving mechanism, as described hereinafter. On an extension of the shaft 16 are mounted a series of switch-operating cams 30, 31, 32, and 33 described more fully hereinafter.

Referring now to Fig. 2 of the drawing, there is represented a schematic circuit diagram of an electric control system for use with the driving system of Figure 1. This control system includes means for controlling the shutter driving mechanism to accelerate the shutter rapidly to substantially its exposure velocity during movement over one of the limiting portions of its range and for controlling the shutter driving mechanism to actuate the shutter at constant exposure velocity during movement over the central portion of its range. Specifically, the control system includes switch means operable at one limit of movement of the shutter to energize one of the electromagnetic clutches 20, 27 to engage the same and to energize the brake 28 to release the same to accelerate the shutter rapidly to substantially its final exposure velocity during its movement over its initial limiting portion, for example, from the liimting position 11a, 11a to the upper edge of the aperture 10a of the shutter 10. This switch means comprises a micro-switch $S_1$ having a contact element 34 movable between an upper set of contacts 35, 35 and a lower set of contacts 36, 36. The switch $S_1$ is disposed to be actuated by the cam 32 driven by the shaft 16 as described above. This switch means also includes a micro-switch $S_2$ comprising a contact element 37 movable between an upper set of contacts 38, 38 and a lower set of contacts 39, 39 and actuated by the cam 33. As described in more detail hereinafter, the switch means for effecting energization of the clutch 20 (which may be termed the "forward" clutch) includes the contact elements 36, 36 of switch $S_1$ and the upper contacts 38, 38 of switch $S_2$ which are connected to energize the clutch 20 from current-supply terminals 40 through a manually operable switch, such as a pushbutton 41, and a conductor 42. The switches $S_1$ and $S_2$, as described in more detail hereinafter, also are effective simultaneously to energize the brake 28 to release the same.

The control system also includes means for controlling the shutter driving mechanism to decelerate the shutter to zero vleocity during movement over the final limiting portion of its range. This controlling means comprises switch means operable substantially upon subsequent completion of movement of the shutter of camera 10 over its central exposure portion to de-energize the forward clutch 20 to release the same and to energize the brake 28 to engage the same, thereby to decelerate the shutter of the camera 10 during its movement over the other of its limiting portions, as over the movement from the lower edge of the aperture 10a to the position 11b, 11b. This switch means comprises the upper set of contacts 35, 35 of the switch $S_1$ and the lower set of contacts 39, 39 of the switch $S_2$ which, as described hereinafter, are effective upon approximately 180° of rotation of the shaft 16 and the cams 32, 33 to energize the clutch 27 (which for convenience may be termed the "reverse" clutch) and to energize the brake 28 to release the same.

The configurations of the cams 32 and 33 are such that they de-energize the clutches 20 and 27 slightly before the shutter reaches each of its limiting positions 11a, 11a and 11b, 11b in order to prevent shock to the shutter mechanism by travelling to its limiting position at full velocity. Therefore, the control system also includes means for actuating the shutter to its limiting position at reduced speed, as by partially engaging one of the clutches and disengaging the brake 28. This means comprises a control circuit conductor 43 connected to energize these elements from the current-supply terminals 40 through a current reducing resistor 44 and a manually operable switch, such as a pushbutton 45. Portions of the control circuit conductors 42 and 43 are shown in dotted lines to indicate that the control station including the pushbuttons 41 and 45 is normally located at a point remote from the camera and its driving mechanism. The circuit 43 for supplying reduced energization of the clutches and energizing the brake is controlled by a limit switch $S_3$ having a contact element 46 movable between an upper contact 47 and a lower contact 48 and a limit switch $S_4$ having a contact element 49 movable between an upper contact 50 and a lower contact 51. The switches $S_3$ and $S_4$ are actuated by cams 31 and 30, respectively, driven by the shaft 16. As explained hereinafter, the contacts of the switches $S_3$ and $S_4$ are electrically interlocked to effect the desired selective control of the clutches 20 and 27.

The control system further includes means for controlling the shutter driving mechanism to repeat the foregoing cycle of operations in the reverse direction to make a succeeding exposure. This controlling means may act in response to movement of the shutter to either limiting position to release one of the clutches, for example, the forward clutch, and to engage the other clutch, for example, the reverse clutch, to condition the system for a succeeding exposure. This means may be in the form of a two-position transfer relay 52 for selectively controlling the energization of the clutches 20, 27 and having operating windings 52a and 52b for selectively actuating it to one or the other of its positions. The relay 52 includes a pair of contact elements 52c, 52d movable between the left-hand contacts 52e, 52f and the right-hand contacts 52g, 52h, respectively.

As described hereinafter, the switches $S_3$ and $S_4$ comprise limit switches and the configuration of the cams 30 and 31 is such that each of these switches is responsive to movement of the camera shutter to one of its limiting positions for energizing the windings of the transfer relay 52 to actuate it from one position to the other. If desired, a current limiting resistor 55 is connected in series with the clutches 20, 27, while a current limiting resistor 56 is connected in series with the brake 28. Also, current limiting resistors 57 and 58 are shunted across the contacts 35, 35 of switch $S_1$ and the contacts 38, 38 of the switch $S_2$, respectively. Capacitors 59, 60, 61, and 62 may be connected at appropriate points to limit arcing at the various switch contacts.

Referring now to the operation of the camera shutter driving system and its control system described above, it will be assumed that initially the several parts are in the positions illustrated in Fig. 2 of the drawing so that the shutter slit bars 11, 11 occupy the position 11a, 11a of Fig. 1. In effecting an exposure, it is desired that the shutter be accelerated rapidly to substantially its final exposure velocity during movement over the initial limiting portion of its range of movement, that is, between the position 11a, 11a and the upper edge of the camera aperture 10a. This may be termed the forward acceleration. To effect this result, the pushbutton 41 is operated to energize the control circuit conductor 42 under which conditions the brake 28 is energized through the contacts 36, 36 of switch $S_1$ and the contacts 52g, 52c of relay 52. Simultaneously, the forward clutch 20 is energized through the contacts 36, 36 of switch $S_1$, the contacts 52g, 52c and 52d, 52h of relay 52, the upper contacts 38, 38 of switch $S_2$, and resistor 55. The full power of the driving motor 13 is thus applied to drive the shutter in its forward direction. During the interval since the preceding exposure, the motor 13 and the intermediate driving gearing have been storing kinetic energy due to their substantial inertia and the full power of the motor and a portion of this kinetic energy are transferred to the shutter driving mechanism so that the shutter is accelerated rapidly to substantially its final velocity by the time it reaches the upper edge of the aperture 10a. At this point, the cam 33 releases the switch $S_2$ to open its upper contacts 38, 38, thereby inserting current reducing resistor 58 in series with the forward clutch 20. However, the resistor 58 is selected so that the reduced current is still sufficient to maintain engagement of the clutch 20 while the shutter is moving at constant velocity across the camera aperture.

When the shutter substantially completes its movement over the central exposure portion of its travel and substantially reaches the lower edge of the aperture 10a, it is desired that it be decelerated rapidly to zero velocity during movement over the other limiting portion of its range of movement, that is, from the lower edge of aperture 10a to the position 11b. The configuration of the cam 32 is such that, as the shutter bars 11, 11 reach the lower edge of the aperture 10a, the switch S₁ opens its lower contacts 36, 36 and closes its upper contacts 35, 35, de-energizing both the forward clutch 20 and the brake 28 to stop the shutter movement. In order to prevent the actuation of the shutter 11 to its limiting position 11b at full velocity, the friction brake is so proportioned in relation to the momentum of the moving parts as to stop the shutter somewhat before it reaches its final limiting position.

In order to reset the camera for a subsequent exposure by motion of the shutter bars 11, 11 in the opposite direction, the shutter is actuated at reduced velocity to its final limiting position. This is effected by closing the manual pushbutton 45, thereby energizing the control circuit conductor 43 through the current-reducing resistor 44. This circuit is effective to excite the brake 28 through the contacts 49, 51 of switch S₄ and the contacts 46, 48 of switch S₃. Simultaneously, reduced excitation is supplied to the forward clutch 20 through these same contacts of switches S₄ and S₃, the contacts 52d, 52h of relay 52, and resistors 58 and 55. The shutter is then actuated at reduced velocity to the limit of its movement, at which point cam 31 opens the contacts 46, 48, de-energizing the circuits of brake 28 and the forward clutch 20. Simultaneously, the winding 52a of the transfer relay 52 is energized through the contacts 49, 51 of switch S₄ and contacts 46, 47 of switch S₃ to actuate the relay 52, which transfers the energizing circuits of the switches S₁ and S₂ to condition the shutter to repeat the foregoing steps in the reverse direction for making a succeeding exposure.

The operation of the shutter driving mechanism in the reverse direction is entirely similar to that described above. For initial acceleration, the circuit of brake 28 is completed through the contacts 39, 39 of switch S₂ and contacts 52e, 52c of relay 52, while the circuit of the reverse clutch 27 is completed through the same contacts of switch S₂ and relay 52 and through the contacts 52d, 52f of relay 52, contacts 35, 35 of switch S₁, and resistor 55. During the constant velocity exposure movement, the connections are the same except that switch S₁ opens its contacts 35, 35 to insert resistor 57 in series with the clutch 27 for operation at reduced current. For reverse deceleration over the final limiting portion of the shutter movement, cam 33 opens its contacts 39, 39 and closes its upper contacts 38, 38 de-energizing the reverse clutch 27 and brake 28, whereby the latter reduces the velocity of the shutter rapidly to zero. In order to reset the shutter for a subsequent exposure, manual pushbutton 45 is again closed to excite the brake 28 through the contacts 49, 51 of switch S₄ and contacts 46, 48 of switch S₃. Simultaneously, the reverse clutch 27 is supplied with reduced excitation through the same contacts of the switches S₄ and S₃, the contacts 52d, 52f of relay 52, resistor 57, and resistor 55. The shutter then moves at low velocity to the upper limit of its travel, at which point the cam 30 opens the lower contacts 49, 51 of switch S₄ to de-energize the reverse clutch 27 and brake 28 and simultaneously closes its upper contacts 49, 50 to energize winding 52b of relay 52, which is then actuated to its initial position as illustrated, thereby completing one cycle of operation.

Thus, by the shutter driving system of the invention and its operation as described, the shutter is accelerated smoothly and rapidly to substantially its final velocity in an initial non-exposure portion of its movement; the shutter then moves at uniform velocity across the camera aperture; the shutter is then rapidly decelerated to zero velocity in a final non-exposure portion of its range of movement; and finally the shutter is actuated at reduced velocity to its final limiting position, whereupon the system is reset for a similar operation in the reverse direction to effect a subsequent exposure. The whole operation is effected smoothly and without shock upon the shutter operating mechanism due to sudden starts and stops, thereby eliminating shock loading of any part of the system. In addition, uniform exposure of the film is attained by virtue of the uniform velocity of the shutter during its exposure movement.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for driving the curtain shutter of a focal plane camera to effect uniform exposure of a frame of film, said shutter having a range of movement including a central exposure portion and limiting non-exposure portions, comprising: a driving mechanism for the shutter; means for storing kinetic energy; means for transferring a portion of said kinetic energy to said driving mechanism to accelerate the shutter rapidly to substantially its exposure velocity during movement over one of said limiting portions and for controlling said driving mechanism to actuate the shutter at constant exposure velocity during movement over said central portion; and means for controlling said driving mechanism to decelerate the shutter to zero velocity during movement over the other of said limiting portions.

2. A system for driving the curtain shutter of a focal plane camera to effect uniform exposure of a frame of film, said shutter having a range of movement including a central exposure portion and limiting non-exposure portions, comprising: a driving mechanism for the shutter; a continuously operating constant speed motor having substantial moment of inertia; means for coupling said motor to said driving mechanism to accelerate the shutter rapidly to substantially its exposure velocity during movement over one of said limiting portions and for controlling said driving mechanism to actuate the shutter at constant exposure velocity during movement over said central portion; and means for controlling said driving mechanism to decelerate the shutter to zero velocity during movement over the other of said limiting portions.

3. A system for driving the curtain shutter of a focal plane camera to effect uniform exposure of a frame of film, said shutter having a range of movement including a central exposure portion and limiting non-exposure portions, comprsing: a driving mechanism for the shutter; means for controlling said driving mechanism to accelerate the shutter rapidly to substantially its exposure velocity during movement over one of said limiting portions and for controlling said driving mechanism to actuate the shutter at constant exposure velocity during movement over said central portion; means for controlling said driving mechanism to decelerate the shutter to zero velocity during movement over the other of said limiting portions; and means for actuating the shutter at reduced velocity to its limiting position.

4. A system for driving the curtain shutter of a focal plane camera to effect uniform exposure of a frame of film, said shutter having a range of movement including a central exposure portion and limiting non-exposure portions, comprising: a driving mechanism for the shutter; means for storing kinetic energy; means for transferring a portion of said kinetic energy to said driving mechanism to accelerate the shutter rapidly to substantially its exposure velocity during movement over one of said limiting portions and for controlling said driving mechanism to actuate the shutter at constant exposure velocity during movement over said central portion; means for controlling said driving mechanism to decelerate the shutter to zero velocity during movement over the other of said limiting portion; and means for controlling said driving mechanism to repeat the foregoing cycle of operation in the reverse direction for making a succeeding exposure.

5. A system for driving a camera shutter having a range of movement including a central exposure portion and limiting non-exposure portions comprising: a continuously operating driving element; a driven element for actuating the shutter; a driving mechanism interconnecting said elements and including a clutch; a releasable brake for said driven element; means operable at one limit of movement of the shutter to engage said clutch and to release said brake to accelerate the shutter to substantially its final exposure velocity during its movement over one of said limiting portions; and means operable substantially upon subsequent completion of movement of said shutter over said central portion to release said clutch and to engage said brake to decelerate said shutter during its movement over the other of said limiting portions.

6. A system for driving a camera shutter having a range of movement including a central exposure portion and limiting non-exposure portions comprising: a continuously operating driving element; a driven element for actuating the shutter; a driving mechanism interconnecting said elements and including a clutch; a releasable brake for said driven element; means operable to engage said clutch and to release said brake to accelerate the shutter to substantially its final exposure velocity during its movement over one of said limiting portions; and means operable substantially upon subsequent completion of movement of said shutter over said central portion to release said clutch and to engage said brake to decelerate said shutter during its movement over the other of said limiting portions.

7. A system for driving a camera shutter having a range of movement including a central exposure portion and limiting non-exposure portions comprising: a continuously operating driving element; a driven element for actuating the shutter; a driving mechanism interconnecting said elements and including a clutch; a releasable brake for said driven element; said driving mechanism including means for initiating operation of said driven element at one limit of movement of the shutter and for engaging said clutch and releasing said brake to accelerate the shutter to substantially its final exposure velocity during its movement over one of said limiting portions; means operable substantially upon subsequent completion of movement of said shutter over said central portion to release said clutch and to egnage said brake to decelerate said shutter during its movement over the other of said limiting portions; and means for returning the shutter to its original position.

8. A system for driving a camera shutter having a range of movement including a central exposure portion and limiting non-exposure portions which are small fractions of said exposure portion comprising: a continuously operating driving element; a driven element for actuating the shutter, a driving mechanism interconnecting said elements and including a clutch; a releasable brake for said driven element; means operable at one limit of movement of the shutter to engage said clutch and to release said brake to accelerate the shutter rapidly to substantially its final exposure velocity during its movement over one of said limiting portions; and means operable substantially upon subsequent completion of movement of said shutter over said central portion to release said clutch and to engage said brake to decelerate said shutter rapidly during its movement over the other of said limiting portions.

9. A system for driving a camera shutter having a range of movement including a central exposure portion and limiting non-exposure portions comprising: a continuously operating driving element having substantial moment of inertia; a driven element for actuating the shutter; a driving mechanism interconnecting said elements and including a clutch; a releasable brake for said driven element; means operable at one limit of movement of the shutter to engage said clutch and to release said brake to accelerate the shutter rapidly to substantially its final exposure velocity during its movement over one of said limiting portions; and means operable substantially upon subsequent completion of movement of said shutter over said central portion to release said clutch and to engage said brake to decelerate said shutter rapidly during its movement over the other of said limiting portions.

10. A system for driving a reversible camera shutter having a range of movement including a central exposure portion and limiting non-exposure portions comprising: a continuously operating driving element; a driven element for actuating the shutter; a reversible driving mechanism interconnecting said elements and including a pair of friction clutches selectable to actuate the shutter in either direction; a releasable brake for said driven element; means operable at one limit of movement of the shutter to engage a selected one of said clutches and to release said brake to accelerate the shutter to substantially its final exposure velocity during its movement over one of said limiting portions; and means operable upon subsequent completion of movement of said shutter over said central portion to release said selected clutch and to engage said brake to decelerate said shutter during its movement over the other of said limiting portions.

11. A system for driving a reversible camera shutter having a range of movement including a central exposure portion and limiting non-exposure portions comprising: a continuously operating driving element; a driven element for actuating the shutter; a reversible driving mechanism interconnecting said elements and including a pair of friction clutches selectable to actuate the shutter in either direction; a releasable brake for said driven element; means operable at one limit of movement of the shutter to engage one of said clutches and to release said brake to accelerate the shutter to substantially its final exposure velocity during its movement over one of said limiting portions; means operable upon subsequent completion of movement of said shutter over said central portion to release said one of said clutches and to engage said brake to decelerate said shutter during its movement over the other of said limiting portions; and means responsive to movement of the shutter to either limiting position and to release said one of said clutches and engage the other to condition the system for a succeeding exposure.

12. A system for driving a reversible camera shutter having a range of movement including a central exposure portion and limiting non-exposure portions comprising: a continuously operating driving element; a driven element for actuating the shutter; a reversible driving mechanism interconnecting said elements and including a pair of electromagnetic clutches selectable to actuate said shutter in either direction; an electromagnetic break for said driven element; switch means operable at one limit of movement of the shutter to energize one of said clutches and to release said brake to accelerate the shutter to substantially its final exposure velocity during its movement over one of said limiting portions; switch means operable upon subsequent completion of movement of said shutter over said central portion to de-energize said one of said clutches and to engage said brake to decelerate said shutter during its movement over the other of said limiting portions; a two-position transfer relay for selectively controlling the energization of said clutches; and a pair of limit switches, each responsive to movement of the shutter to one of its limiting positions for successively actuating said transfer relay from one position to the other.

13. A system for driving a camera shutter having a range of movement including a central exposure portion and limiting non-exposure portions comprising, a continuously operating driving element; a driven element for actuating the shutter; a driving mechanism interconnecting said elements and including a clutch; a releasable brake for said driven element; means operable at one limit of movement of the shutter to engage said clutch and to release said brake to accelerate the shutter to substantially its final exposure velocity during its movement over one of said limiting portions; means operable upon subsequent completion of movement of said shutter over said central portion to release said clutch and to engage said brake to decelerate said shutter during its movement over the other of said limiting portions; and means for partially engaging said clutch and partially disengaging said brake to effect actuation of said shutter to its limiting position at reduced speed.

14. A system for driving a camera shutter having a range of movement including a central exposure portion and limiting non-exposure portions comprising: a continuously operating driving element; a driven element for actuating the shutter; a driving mechanism interconnecting said elements and including an electromagnetic friction clutch; an electromagnetic friction brake for said driven element; means operable at one limit of movement of the shutter to engage said clutch and to release said brake to accelerate the shutter to its final exposure velocity during its movement over one of said limiting portions; means operable upon subsequent completion of movement of said shutter over said central portion to release said clutch and to engage said brake to decelerate said shutter during its movement over the other of said limiting portions; and a circuit for effecting reduced energization of said clutch and said brake to effect actuation of said shutter to its limiting position at reduced speed.

References Cited in the file of this patent

UNITED STATES PATENTS

| | | |
|---|---|---|
| 2,309,300 | Briechle et al. | Jan. 26, 1943 |
| 2,321,361 | Chappell et al. | June 8, 1943 |
| 2,327,780 | Fuerst | Aug. 24, 1943 |
| 2,383,381 | Hammond | Aug. 21, 1945 |

FOREIGN PATENTS

| | | |
|---|---|---|
| 641,905 | Great Britain | Aug. 23, 1950 |